(12) United States Patent
Reich et al.

(10) Patent No.: US 7,562,123 B2
(45) Date of Patent: Jul. 14, 2009

(54) SYSTEMS AND METHODS FOR DISTRIBUTED GROUP FORMATION AND MAINTENANCE IN GEOGRAPHICALLY BASED NETWORKS

(75) Inventors: James E. Reich, Mountain View, CA (US); Juan Liu, Milpitas, CA (US); Jie Liu, Mountain View, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 833 days.

(21) Appl. No.: 10/655,301

(22) Filed: Sep. 5, 2003

(65) Prior Publication Data

US 2005/0055417 A1    Mar. 10, 2005

(51) Int. Cl.
G06F 15/16     (2006.01)
G01S 7/40      (2006.01)
(52) U.S. Cl. .................. 709/208; 709/205; 342/174
(58) Field of Classification Search .................. 709/208, 709/225, 219, 1, 205; 370/338; 455/456.1; 342/174
See application file for complete search history.

(56) References Cited

U.S. PATENT DOCUMENTS

| | | | |
|---|---|---|---|
| 6,275,847 B1 | 8/2001 | Robinson | |
| 6,366,913 B1 | 4/2002 | Filter, Jr. et al. | |
| 2001/0022558 A1* | 9/2001 | Karr et al. | 342/450 |
| 2002/0000920 A1 | 1/2002 | Kavner | |
| 2002/0057340 A1 | 5/2002 | Fernandez et al. | |
| 2002/0103911 A1 | 8/2002 | Meifu et al. | |
| 2002/0129157 A1* | 9/2002 | Varsano | 709/232 |
| 2002/0161889 A1* | 10/2002 | Gamache et al. | 709/226 |
| 2004/0103194 A1* | 5/2004 | Islam et al. | 709/225 |
| 2004/0190476 A1* | 9/2004 | Bansal et al. | 370/338 |

OTHER PUBLICATIONS

"Distributed Services for Information Dissemination in Self-Organizing Sensor Networks", Lim, to appear in the Special Issue on Distributed Sensor Networks for Real-Time Systems with Adaptive Reconfiguration, Journal of Franklin Institute, 2001.*
"Protocols for Self-Organization of a Wireless Sensor Network", Sohrabi et al., IEEE Personal Communications, Oct. 2000.*
"Geographical and Energy Aware Routing: a recursive data dissemination protocol for wireless sensor networks", Yu et al., Aug. 14, 2001.*
"Relative Location Estimation in Wireless Sensor Networks", Patwari et al., IEEE Transactions on Signal Processing, vol. 51, No. 8, Aug. 2003.*

* cited by examiner

Primary Examiner—George C Neurauter, Jr.
Assistant Examiner—Mark D Fearer
(74) Attorney, Agent, or Firm—Oliff & Berridge, PLC

(57) ABSTRACT

In a distributed sensor network, one or more devices, for example, forming a collaborative group, are associated with a physical phenomenon based on geographical proximity. The sensor network is capable of detecting new phenomena and changing the membership of the collaborative group as the phenomenon changes. Sensors not associated with a detected phenomenon are available to detect new phenomenon, and one group may exist per phenomenon. Upon detection of a phenomenon, a group of nodes is formed and a leader node is elected. As the phenomenon changes over time, new devices come into proximity of the phenomenon and are prevented from forming independent groups associated with the phenomenon. This accomplished in a decentralized way with communication restricted to local neighbors. In a tracking sensor network using a relatively small number of sensors, the sensors are active and maintain a coherent belief associating their measurements with a single common vehicle.

8 Claims, 11 Drawing Sheets

SYSTEMS AND METHODS FOR DISTRIBUTED GROUP FORMATION AND MAINTENANCE IN GEOGRAPHICALLY BASED NETWORKS

STATEMENT OF GOVERNMENT FUNDING

The work described in this application was made with Government support under Agreement No. F30602-00-C-0139 awarded by DARPA. The Government has certain rights in this invention.

BACKGROUND OF THE INVENTION

1. Field of Invention

The systems and methods of the invention are directed to distributed applications such as sensor networks.

2. Description of Related Art

The U.S. Patent Application Publication No. 2002/000920 discloses detection and maintenance of moving vehicle data in an array of sensors. All vehicles are identified at a fixed entry point and are sensed by only a single sensor at a time.

U.S. Pat. No. 6,366,913 discloses techniques for dynamic maintenance of group membership based on time-varying attributes, including position. The techniques operate through a centralized directory server.

U.S. Pat. No. 6,275,847 discloses a self-configuring distributed processing system which is pre-configured into cells.

U.S. Patent Application Publication No. 2002/0057340 discloses an integrated fixed and/or wireless network for monitoring and processing remote indoor local movable objects where an object database or functionally equivalent data structure is provided in digital storage and is accessible to control software that dynamically stores one or more positional and relative movements, as well as optional and associated map data.

U.S. Patent Application Publication No. 2002/0103911 discloses the idea of a moving information bubble.

As processor and networking technology increase in capability and decrease in price, large networks of geographically-distributed devices become practical where one or more devices are assigned responsibility for nearby physical phenomena. These phenomena may be measured using sensors nodes, which may affect the entities they measure through actuators, or may simply be assigned computational responsibility for the phenomena. A sensor node typically includes one or more sensors of the same type or of different types, such as, for example, acoustic and/or seismic, an associated processor and a transceiver. These networks may be dynamic in nature in the sense that both the devices, that is the nodes, and the entities may be mobile. New entities may appear, that is be detected, within the network, may move, thereby changing the responsible sensor nodes, or may disappear entirely.

Known systems of this type have moved all of the sensor data to central or pre-assigned regional aggregation sites and have not allowed the group of active nodes to vary according to current estimates of the position and extent of the phenomenon. Scalability and latency generally rule out use of centralized approaches for very high node-count, high phenomenon-count, or very widely-distributed systems, and region-based approaches with fixed aggregation centers are inflexible and often require complex multilayered overlapping regions to work properly. Wireless sensor networks are particularly ill-suited to centralization because of their limited battery power, and nodes close to aggregation centers must handle a relatively larger quantity of messages and tend to run out of power early, resulting in system failure. Fixed architectures also tend to concentrate most of the computational work at a single node, which is a highly inefficient use of a system with hundreds or thousands of nodes, and results in unnecessary latency.

Concurrent with these developments is work on data centric ad hoc networking, such as disclosed in Yu, et al., UCLA Computer Science Department Technical Report, UCLA/csd-tr-01-0023, May 2001. These systems allow data to be disseminated according to attributes of the local nodes in a publish-subscribe type of architecture. However, this has been expensive to use in large sensor networks because it requires flooding each time a subscription is changed. This approach has been used in several sensor network architectures to either efficiently send sensor data to a central node despite unreliable links and failing intermediate nodes or to set up fixed local groups. Still, new capabilities such as geographical routing, disclosed in the aforementioned Yu et al. publication, now allow data to be efficiently geographically routed in a dynamic fashion, changing the active region on a per message basis.

Sensor networks are subject to certain resource constraints such as, for example, limited onboard stored energy (e.g., battery) or limited power availability (as with solar power) and limited network communication bandwidth. Networked sensor nodes typically operate untethered and have a microprocessor with limited memory for signal processing and task scheduling. Sensor nodes may be equipped with various types of sensors including, for example, acoustic microphone arrays, video and/or still cameras, Infrared, seismic and/or magnetic sensing devices. Sensor nodes also communicate wirelessly with a number of other nodes within communication range.

SUMMARY OF THE INVENTION

In various exemplary embodiments of the systems and methods of this invention, a collaborative group of devices (nodes) is established when a phenomenon is detected. A network sensor leader node is then elected. This network sensor leader node may merely manage the membership of the local group of sensor nodes, and in exemplary embodiments of the systems and methods of this invention, act as an aggregation center that processes sensor data, and/or as a proxy node that communicates the group's results to the outside world.

The systems and methods according to various exemplary embodiments of this invention apply to a wide variety of sensor network application functions, including, for example, detection, tracking and classification, and various applications such as, for example, environmental monitoring of items such as vehicles, including vehicular traffic, habitat and security, industry sensing and diagnostics, such as in factories and appliances, infrastructure protection, such as, for example, power grids, water distribution, incoming missiles, and battlefield awareness, including, for example, single or multiple target tracking and prediction.

In various exemplary embodiments of the systems and methods according to this invention, sensor node group members are added and dropped as the phenomenon moves. This may be done for scalability, for example. The nodes involved in monitoring a particular phenomenon may be constrained to a finite number of nodes in a local region around the phenomenon in order to minimize the distance measurements that must be transmitted and nodes which are no longer needed may be freed up to monitor new emerging phenomenon once the current phenomenon leaves the region.

In various exemplary embodiments of the systems and methods of this invention, the creation of new collaborative sensor node groups may be suppressed as new sensor nodes come into range of the phenomenon. One reason for doing this is because new nodes will still be looking to detect new phenomena and to instantiate sensor node groups to monitor these phenomena.

These and other features and advantages of this invention are described in, or are apparent from, the following detailed description of various exemplary embodiments of the systems and methods according to this invention.

BRIEF DESCRIPTION OF THE DRAWINGS

Various exemplary embodiments of this invention will be described in detail, with reference to the following figures, wherein.

DETAILED DESCRIPTION OF EXEMPLARY EMBODIMENTS

Various exemplary embodiments of the systems and methods according to this invention assume that each sensor node in the network has the ability to detect new phenomenon and is capable of receiving messages sent to it as well as sending messages to all nodes within a geographic region specified by a bullion function or with the coordinates of nodes within this region. These coordinates may be a tuple of continuous or discrete values. A "tuple" is conventionally defined as an ordered set of values.

According to various exemplary embodiments of the systems and methods of this invention, a model exists for each sensor node that defines three regions. A first region, labeled $R_{DETECT}$, is a geographical region containing all locations where a target phenomenon can be detected by a particular sensor node. This geographical region is typically conservative and includes even low probability locations. A second region, labeled $R_{INITIAL}$, is a geographical region containing all other sensor nodes capable of detecting a target located within the detection range of this sensor node. This model typically assumes that the sensor node does not yet have an estimate of the state, e.g., position and extent, for example, of the phenomenon. A third region, labeled $R_{ALARM}$, is a geographical region containing all other sensor nodes capable of detecting a phenomenon, given an estimate (referred to as the belief state) of its state. Typically, the $R_{ALARM}$ region will be significantly smaller than the $R_{INITIAL}$ region.

Figure 1:
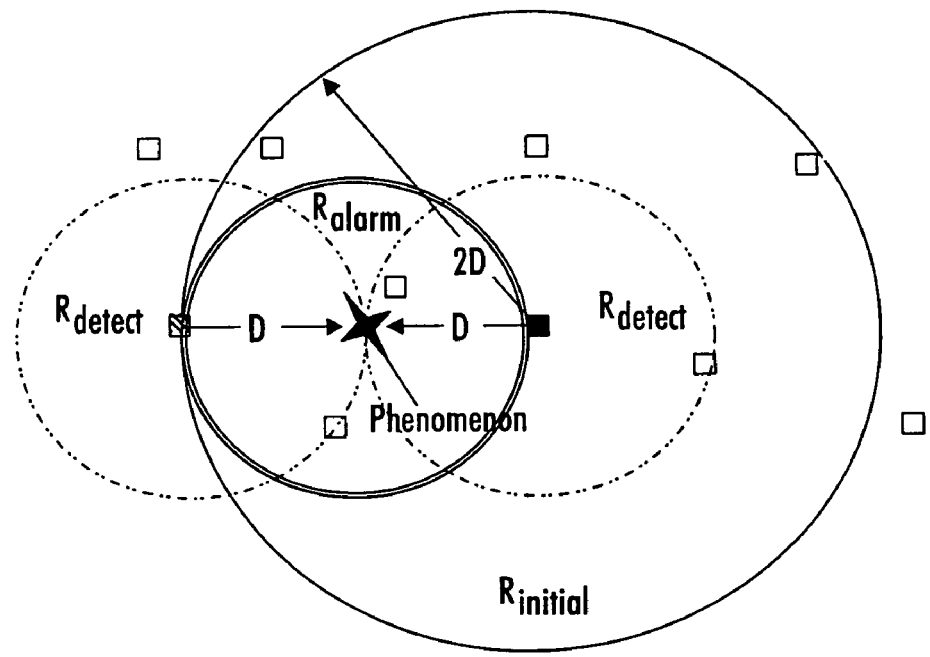
FIG. 1 is a diagram of regions of interest in a sensor network.

Depending upon the characteristics of the detection method, these geographical regions may be functions of both the coordinates of the detecting sensor node, and of the coordinates and types of sensor nodes in the local neighborhood. The exemplary regions shown in FIG. 1 are for a simple case of a homogeneous sensor network where the phenomenon is a point which can be sensed within a range D.

According to various exemplary embodiments of the systems and methods of this invention, initially the sensor nodes of the network are all in DETECT mode waiting to detect a new phenomenon. This detection may be performed, for example, using a hypothesis test to evaluate the likelihood that measurements correspond to a new phenomenon rather than background noise. All sensor nodes may perform this detection in parallel.

Once a detection occurs at a sensor node, time stamped DETECTION packets are broadcast by the detecting sensor node to all sensor nodes in the region $R_{INITIAL}$ and the broadcasting sensor node switches to IDLE mode, where it waits to see if it can become a leader node of this group. In exemplary embodiments, the maximum propagation time across the region $R_{INITIAL}$ may be assumed to be known. The broadcasting sensor node may become a leader node if that maximum propagation time passes without receiving a packet from a different sensor node with an earlier time stamp. In other various exemplary embodiments, other leader election approaches may be used. For example, instead of using time stamp and likelihood ratio as detection comparison index, one may assign a unique ID to each node and simply use the node IDs as tie breaker. For another example, a "rendezvous node" can be assigned to each geographical region so that all initial detection n messages within that region are sent to that node. Then a rendezvous node can negotiate with nearby rendezvous nodes and assign the initial leader.

In the first exemplary embodiment described above, the "time out" approach, if sufficient time passes without receiving an earlier DETECTION packet, the broadcasting sensor node becomes a leader node of the group corresponding to this phenomenon and this leader node begins estimating the state of the phenomenon. If an earlier DETECTION is received, or a DETECTION packet is received while this the sensor node is in DETECT mode, the sensor node may be part of the group, but not the leader node of the group (e.g., of the sensor nodes in $R_{INITIAL}$). In this exemplary embodiment, non-leader sensor nodes shift to IDLE mode. Detection of this type of phenomenon is then no longer performed (i.e. is suppressed) by the non-leader sensor nodes, which then wait for commands from a leader node.

In other exemplary embodiments, non-leader nodes may immediately participate in sensing the phenomenon and report their results to the neighboring nodes or to the leader node, or may continue detecting until they receive explicit SUPPRESSION messages. In exemplary embodiments according to the systems and methods of this invention, suppression may be equivalent to group membership, that is, sensor nodes associated with a particular phenomenon are assigned exclusively to that phenomenon.

Once an initial estimate is obtained of the state, e.g., position and extent, of the phenomenon, the leader node may then compute $R_{ALARM}$ and redefine the group to include only sensor nodes in this $R_{ALARM}$ region. This may be done in a number of ways, three of which are discussed below.

In a first approach, all suppressed sensor nodes within the region $R_{INITIAL}$-$R_{ALARM}$ (i.e. the nodes within $R_{INITIAL}$ which are not in $R_{ALARM}$) may be sent UNSUPPRESSION packets, disassociating them from the group and putting them back into DETECT mode. In a second approach, all sensor nodes within the region $R_{INITIAL}$ may be sent packets with a definition of $R_{ALARM}$ and may determine based on, for example, their own position whether or not they are members of $R_{ALARM}$ and act accordingly. In a third approach, all sensor nodes within the region $R_{ALARM}$ may be sent SUPPRESS packets and other sensor nodes may time out and return to DETECT mode, autonomously.

As time progresses, according to the various exemplary embodiments according to the systems and methods of this invention, additional measurements may be taken and new state estimates of the phenomenon may be made. As the phenomenon moves, $R_{ALARM}$ is recomputed and the old region is retained as $R_{ALARM\ OLD}$, and one or more techniques corresponding to those set forth above may be used to send out packets updating $R_{ALARM}$ group membership and suppressing detection. For example, all sensor nodes which are in $R_{ALARM\ OLD}$ but not in $R_{ALARM}$ may be sent an UNSUPPRESSION packet and return to DETECT mode. All sensor nodes in $R_{ALARM}$ but not in $R_{ALARM\ OLD}$ may be sent SUPPRESSION packets and stop detecting that phenomenon.

In another exemplary embodiment, all sensor nodes within the region $R_{ALARM\ OLD}$ plus $R_{ALARM}$ are sent packets with the definition of $R_{ALARM}$, and determine, based on their own position, whether or not they are group members and behave accordingly.

In another exemplary embodiment, all sensor nodes within the region $R_{ALARM}$ are sent SUPPRESS packets. Other sensor nodes time out and return to DETECT mode, autonomously. This exemplary embodiment presumes some maximum interval between recomputations of the extent of the regions and the resulting new set of SUPPRESS messages, after which suppression times out and the nodes which have not been explicitly suppressed for that period may return to DETECT mode.

In various exemplary embodiments according to the systems and methods of this invention, leadership may pass to a new sensor node based on the new estimates of the state of the phenomenon and/or state of the sensor node, for example, its power source condition or may be randomly selected from valid candidates within the sensing range. In one exemplary embodiment of the systems and methods according to this invention, a HANDOFF packet is sent to the new network sensor leader node, carrying the current state and the previous value of $R_{ALARM}$. The new leader node will thus be able to send out SUPPRESSION and UNSUPPRESSION packets as described above, once it updates its state estimate based on received or measured data.

In various exemplary embodiments, if state estimation indicates that the phenomenon no longer exists, unsuppression messages may be sent to all sensor nodes in the current $R_{ALARM}$ area and the leader node may return to DETECT mode.

In various exemplary embodiments according to the systems and methods according to this invention, when multiple classes of phenomenon overlap, a separate operating mode may be kept for each class of phenomenon or distinguishable individual phenomenon, allowing multiple phenomena to be monitored completely independently. Various embodiments of the systems and methods according to this invention assume a networking approach based on pushing (i.e. actively sending) detection, suppression, and unsuppression packets to a dynamic geographical location. Where this capability is not available, a pull (i.e. waiting for messages to arrive which match existing desired attributes) equivalent is possible in which the unassociated, that is detecting, sensor nodes subscribe to packets with destinations within their respective $R_{DETECT}$ regions and intermediate sensor nodes forward to all sensor nodes where this destination region intersects with the $R_{ALARM}$ region contained in the (UN)SUPPRESS or $R_{INITIAL}$ region of the DETECT packet. In various embodiments, this may be implemented by maintaining, for example, local routing tables at each sensor node and addressing appropriate sensor nodes by name or through a database lookup and then sending data to the appropriate sensor nodes by way of one of a plurality of point-to-point routing protocols.

The systems and methods of this invention need not be restricted to cases where new groups are implicitly created upon sensor detection of phenomenon. Phenomenon may be explicitly created by other mechanisms and thereafter may be tracked by the same techniques. SUPPRESSION packets will then indicate only group membership and the detection mode will simply be replaced by the IDLE mode, while $R_{DETECT}$, $R_{INITIAL}$ and $R_{ALARM}$ will denote spatial regions in which any new members must reside in based on the location of the node initially creating the group ($R_{DETECT}$ and $R_{INITIAL}$) or based on current knowledge of the group state ($R_{ALARM}$).

A detailed exemplary embodiment of distributed detection in a target tracking application is discussed below. Assuming a homogenous ad hoc sensor network where all sensors are identical microphone-based acoustic energy sensors, before a target approaches the area covered by the sensor network, every sensor node is detecting, and makes independent decisions as to whether the target is present within the node's detection range. The rationale for such independent decision making is to avoid data communication during long periods when no target is present. Once a target is detected, multiple sensors collaborate with each other to elect a single leader node to track the target. Sensors other than the elected leader are free to go into a "sleep" mode, or to assume some other task, such as tracking a different target. A single-leader scheme such as this is especially well-suited for resource-constrained sensor networks because of its superior power and bandwidth conservation.

Single sensor detection principles, may be employed, for example, as follows.

Each sensor needs a decision rule to decide if a target is present within some pre-specified detection range. Assume the following sensing model:

$$r_i(t) = S(t)/|L_{target} - L_{sensor\ i}| + n_i(t), \qquad (1)$$

where $r_i(t)$ is the sound waveform received by sensor i, S(t) is the sound wave emitted by the target, $L_{target}$ and $L_{sensor\ i}$ are locations of the target and sensor I, respectively, and $|L_{target} - L_{sensor\ i}|$ measures the distance between the two locations. "d" is used for shorthand notation of $|L_{target} - L_{sensor\ i}|$ when there is no confusion. The measurement noise in waveform is $n_i(t)$.

The following assumptions are made:

$n_i(t)$ is white with zero mean and some known variance $\sigma_n^2$;

S(t) has energy $E_s$ (i.e. power integrated over a fixed buffer); and

Signal and noise are statistically independent.

The acoustic energy sensors compute the sound energy from the raw waveform:

$$z_1 = \frac{1}{N} \sum_{n=1}^{N} |r_i(t)|^2, \qquad (2)$$

where N is buffer size (typically some large number such as 256). From the statistics of signal and noise, we can derive the distribution of $z_i$. It has the following characteristics:

Mean = $(E_s/d^2 + \sigma_n^2)$

Variance = $2\sigma_n^4/N + 4(E_s/d^2) \cdot \sigma_n^2/N$.

When N is large, by the central limit theorem, $z_i$ is approximately Gaussian distributed.

For single sensor node detection, hypothesis testing comes as a natural choice. We compare two hypotheses:

H0: target not present in the detection range, i.e., $|L_{target} - L_{sensor\ i}| >= R_{detect}$;

H1: target present in the detection range, i.e., $|L_{target} - L_{sensor\ i}| <= R_{detect}$.

The likelihood under the two hypotheses $p(z_i|H0)$ and $p(z_i|H1)$ are computed and compared. The hypothesis with larger likelihood value is taken as the detection decision. This decision rule guarantees a minimal probability of error. Under the observation model described above, the decision rule takes the form of comparing $z_i$ with a threshold $\tau$: if $z_i > \tau$, then target detection is declared; otherwise, no target presence is declared. The threshold $\tau$ is the dividing point, and can be found by solving the equation:

$$P(\tau|H0) = p(\tau|H1) \qquad (3).$$

Note that this is essentially a composite hypothesis testing problem: in order to compute $p(z_i|H0)$ and $p(z_i|H1)$ from the observational model $p(z_i|L_{target})$, additional assumptions about $L_{target}$ need to be made. For H1, we assume that the target location $L_{target}$ is uniformly distributed in the disk (for a two-dimensional exemplary embodiment of the systems and methods according to the invention) $|L_{target} - L_{sensor\ i}| < R_{detect}$. The null hypothesis H0 requires some additional care because the space $|L_{target} - L_{sensor\ i}| > R_{detect}$ is unbounded. One can consider a best case scenario and a worst case scenario.

Best case scenario: $|L_{target} - L_{sensor\ i}| = \infty$. This leads to a small threshold, hence low miss-detection probability and high false alarm probability.

Worst case scenario:. $|L_{target} - L_{sensor\ i}| = R_{detect}$. This leads to a large threshold, high miss-detection probability, and low false alarm probability.

In a relatively dense sensor network, the worst case scenario Is preferable. A sensor with a false positive detection will perform an election in which only one or a small number of nodes will participate (since there is no real target), potentially wasting a small amount of bandwidth; On the other hand, in the case of false negatives, the sensor collaboration scheme mitigates the effect of high probability missed-detections since the probability of M sensors all missing the target is the product of each sensor's missed-detection probability. With M being large (i.e. a high sensor density), this probability is low enough to be manageable in practice.

Figure 2:
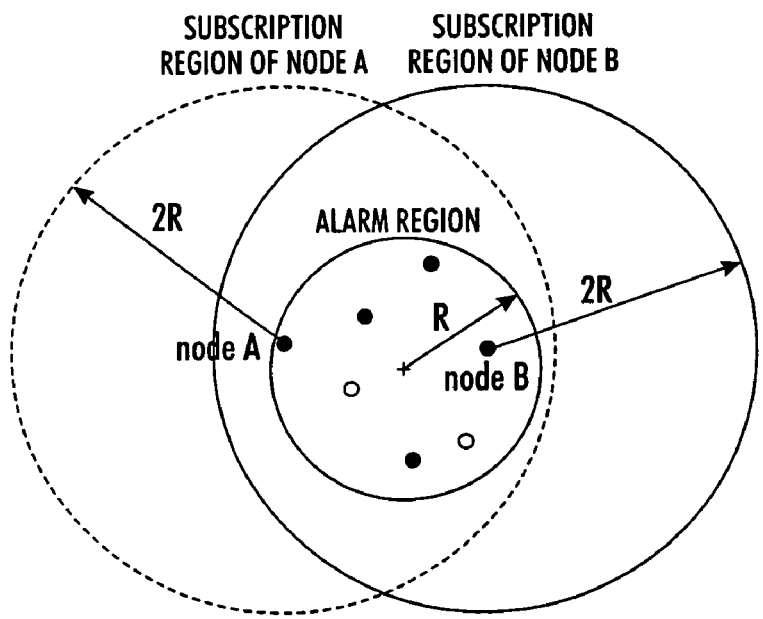
FIG. 2 is a diagram of network sensor leader node election criteria.

Network sensor leader node election principles may also be employed, for example, as described below with reference to FIG. 2.

In an ideal initialization condition, we have a sensor network covering a field in which the target has never appeared before. Each sensor takes an acoustic energy measurement periodically at some fixed time interval $\Delta t$, and makes a detection decision by comparing each measurement to the pre-computed threshold $\tau$. If the sound wave propagation is homogeneous and isotropic, when a target appears in the sensor field at location $L_{target}$, then the sensors physically closer to the target are more likely to declare detection than the sensors farther away. One can compute an "alarm region", similar to a 3-$\sigma$ region of a Gaussian distribution, such that, on average, most (e.g., 99%) of sensors with detections will fall within the region. The region is a disk (for a two-dimensional exemplary embodiment of the systems and methods according to the invention) centered at $L_{target}$ with some radius R, where R is determined by the observational model. In a dense network, the region may contain multiple sensors with detections. To be efficient in computation and power, a single leader node within this region may be elected and the other sensor nodes may be suppressed from being the leader node. The elected leader node initializes the belief state to be a disk (in a two-dimensional exemplary embodiment of the systems and methods according to the invention) with radius $R_{detect}$ around itself, and starts tracking.

Note that the maximum distance between any two points in the region is 2R (from one side of the region to the opposite side). This means that in a publish-subscribe type network, in order to compare attributes of all the sensors in the alarm region, sensors need to subscribe to a region of radius 2R about themselves, while in a "push" type network, initial detection messages must be sent to a radius of 2R from the location of the detecting node. This is shown in FIG. 2. Sensor nodes are marked with small circles, with darkened circles signifying those which have detected the target (some nodes within the region may not detect the target due to background noise, occluding objects, etc.). The alarm region is centered at the target (marked with "+") with radius R. To assure that sensor node A can communicate with sensor node B and vice versa, A and B both need to subscribe to a geographic region of radius 2R around themselves.

Each sensor node with a detection broadcasts a message containing a timestamp corresponding to the moment the detection occurred and the likelihood ratio $p(z_i|H1)/p(z_i|H0)$, indicating the confidence level of the detection. In a publish-subscribe network, this message is directed to all sensor nodes that have subscribed to it (i.e. those within a distance 2R from the node), or is pushed explicitly to a region of radius 2R about the node. By this mechanism, after some time $t_{comm}$ for all the messages to get through, each sensor node receives messages from all other sensor nodes capable of having detected the same target. Each sensor node then examines the messages and compares the timestamp and likelihood ratio with its own. The election procedure is as follows:

If all messages received contain a time stamp later than the sensor node's own timestamp, the sensor node declares itself the leader node.

If there is any message received with an earlier time stamp, then the sensor node is not declared the leader node.

If no messages received contain earlier time stamps, but any message contains a time stamp identical to the sensor node's detection time, then the sensor node compares the likelihood ratios. If the likelihood ratio of the message(s) received with an identical time stamp is lower than the sensor node's likelihood ratio, then the sensor node declares itself leader. Otherwise, the sensor node is not declared the leader node.

By this mechanism, every sensor node can distinguish whether or not it is the elected leader node. No additional notification or confirmation needs to be sent.

Figure 3:
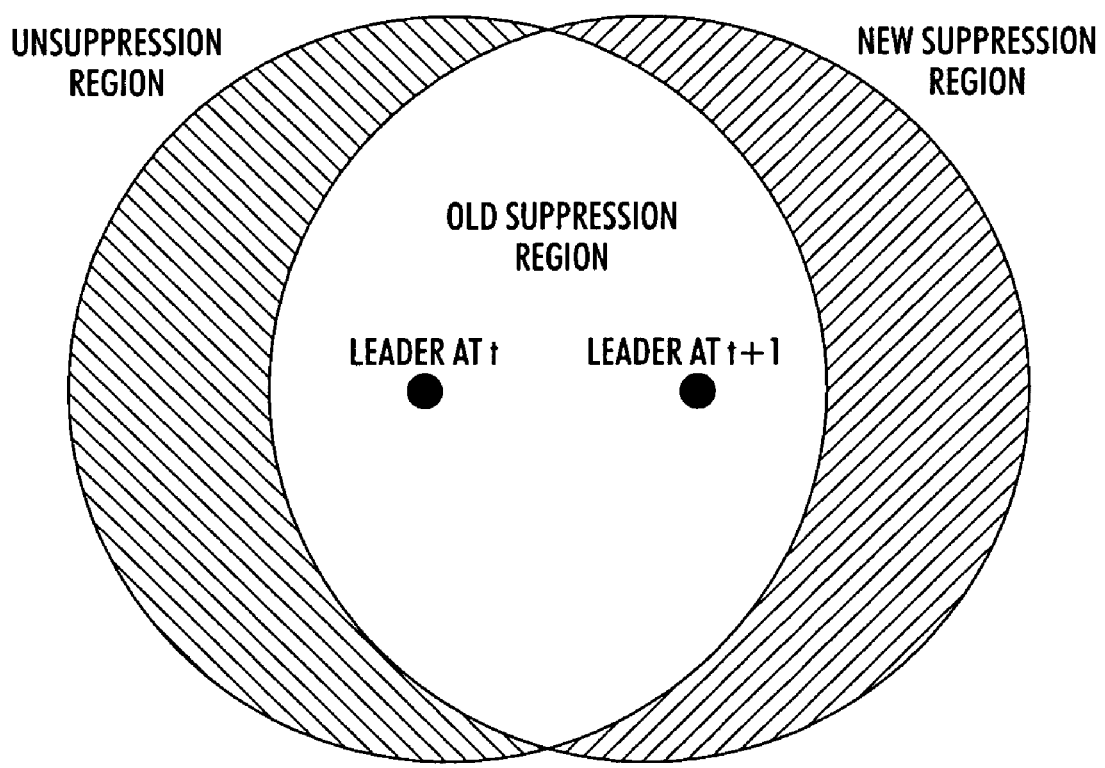
FIG. 3 is a diagram of detection suppression by a leader node.

An exemplary embodiment of detection suppression by a network sensor leader node is illustrated by FIG. 3. Once a network sensor leader node is elected, the leader node initializes a belief state and starts tracking. As the target moves, the leadership may be handed off from one sensor node to another. The sensor nodes within a radius 2R of the leader node should not be detecting to avoid redundancy in computation and network communication. Thus, a suppression region of radius 2R may be designed around the leader node. Sensor nodes in the suppression region are suppressed from detecting.

As the leader node changes, the suppression region will move. FIG. 3 shows two suppression regions at time t and t+1. The two suppression regions may overlap. To reduce network traffic, only the sensor nodes whose status changes must be notified. The leader node at time t notifies the sensor nodes in the crescent-shaped unsuppression region (left hand side of FIG. 3) that they need to start detecting again. The new leader node at time t+1 notifies the sensor nodes in new suppression region (right hand side of FIG. 3) that they need to cease detecting. The sensor nodes in the middle region were suppressed by the old leader node, and do not receive any notice from the new leader node, and thus remain suppressed.

The exemplary embodiment described above as a homogeneous ad hoc sensor network may be implemented in each sensor node using a finite state machine, as discussed below. In this regard, reference is made to FIG. 4, which illustrates an exemplary sensor node group management process on each sensor node.

A sensor node has the following four states:

Detecting: the node is not in any collaborative group, and takes an energy measurement periodically, and compares the measurement with the detection threshold for detecting possible targets.

Leader: the node is the leader node and manages tracking, such as, for example, by taking measurements, updating the track of the phenomenon, and updating the network sensor group measurement.

Idle: the node belongs to a collaborative sensor node group, and passively waits for handoff from another node, for example, a leader node.

Timing out or "waiting-for-time-out": the node is in intermediate states waiting for network messages, such as, for example, potential directions, to be received from other sensor nodes.

Figure 4:
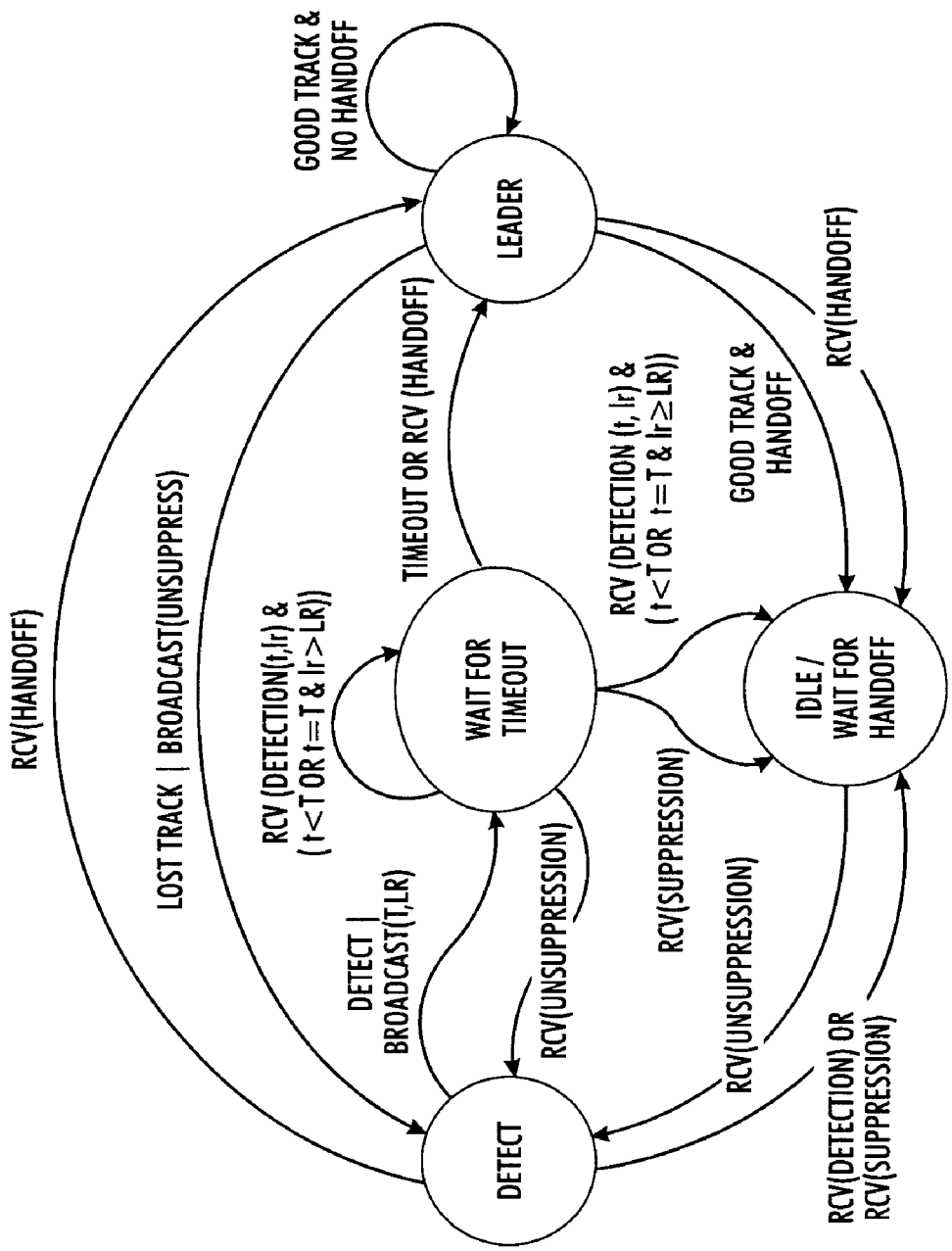
FIG. 4 is a diagram of an exemplary embodiment of a sensor node group management method for each sensor node according to this invention.

Events such as receiving a message or detecting a target trigger a transition from one state to another. FIG. 4 illustrates possible states and transitions that each sensor node may experience. In FIG. 4, capitalized parameters such as "LP" denote local values of a parameter. For example, "LR" means "likelihood ratio", and "T" is current time. Lower case parameters, for example "ll", which also means "likelihood ratio" denote a parameter value received from another network node. "Rcv" is shorthand for "received message event at local node," followed by variable names which represent variable values provided in the message packet.

In this exemplary embodiment, there are four types of messages. In addition to DETECTION, SUPPRESSION, and UNSUPPRESSION messages. As described above, HANDOFF messages carry the belief state used in tracking. The HANDOFF messages contain a time stamp, a belief state, the identifications of sender sensor node and receiver sensor node, and a flag indicating if the track is successful or lost. A track may be considered successful, for example, if the uncertainty of the track is under a specified tolerance level, and may be considered lost otherwise. All sensor nodes in the collaborative group corresponding to a lost track dismiss their membership in the collaborative group and restart detection. The system begins with all nodes in DETECT mode. Once detections occur, the process of leader election, suppression and handoff occurs as described above. During leader election, all detecting nodes enter WAIT FOR TIMEOUT mode, after which the new leader node makes the transition to LEADER mode and other nodes within range of the DETECTION packets enter IDLE/WAIT FOR HANDOFF mode. Leadership is thus handed from node to node, with the new leader transitioning to LEADER mode and nodes within the new $R_{alarm}$ region going to IDLE/WAIT FOR HANDOFF and nodes outside the region returning to DETECT mode.

Figure 5:
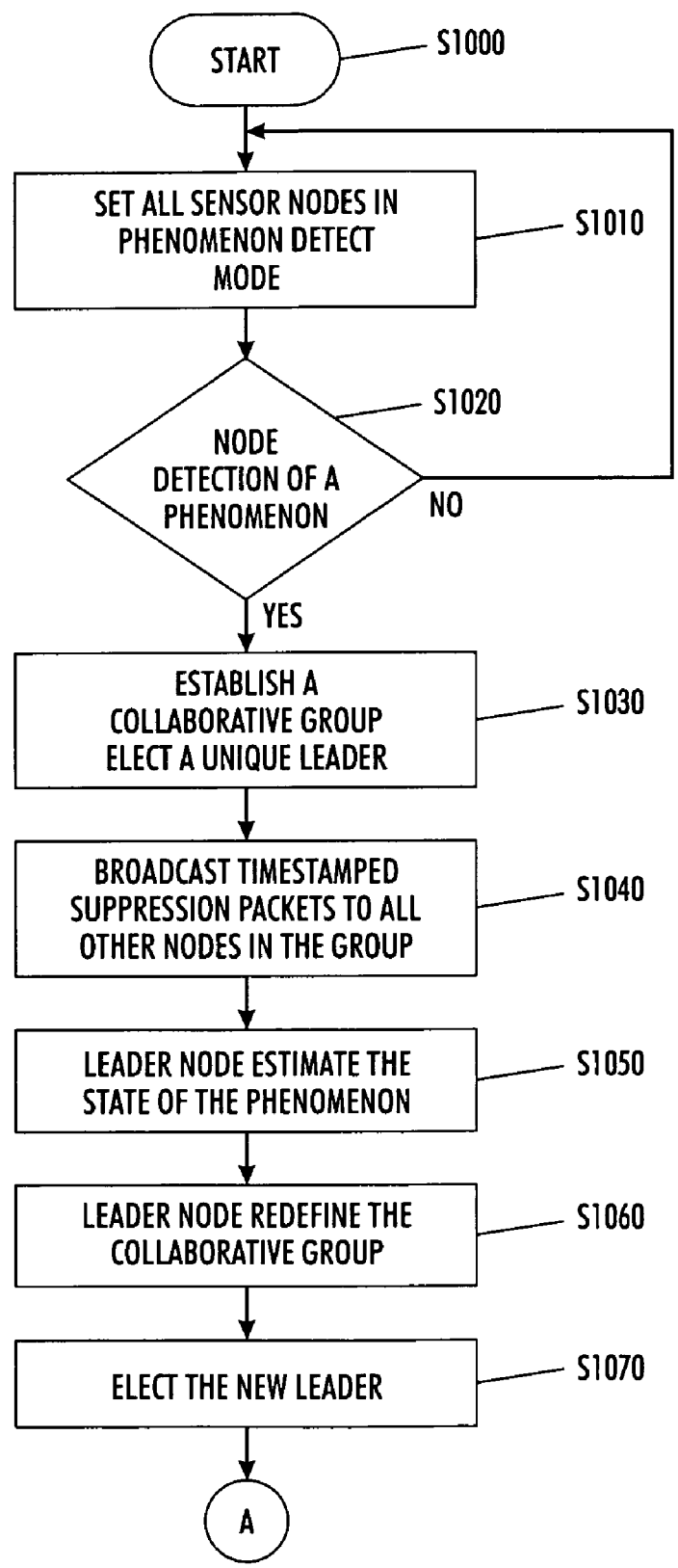
FIGS. 5 and 6 show a flowchart outlining an exemplary embodiment of the methods according to this invention.
Figure 6:
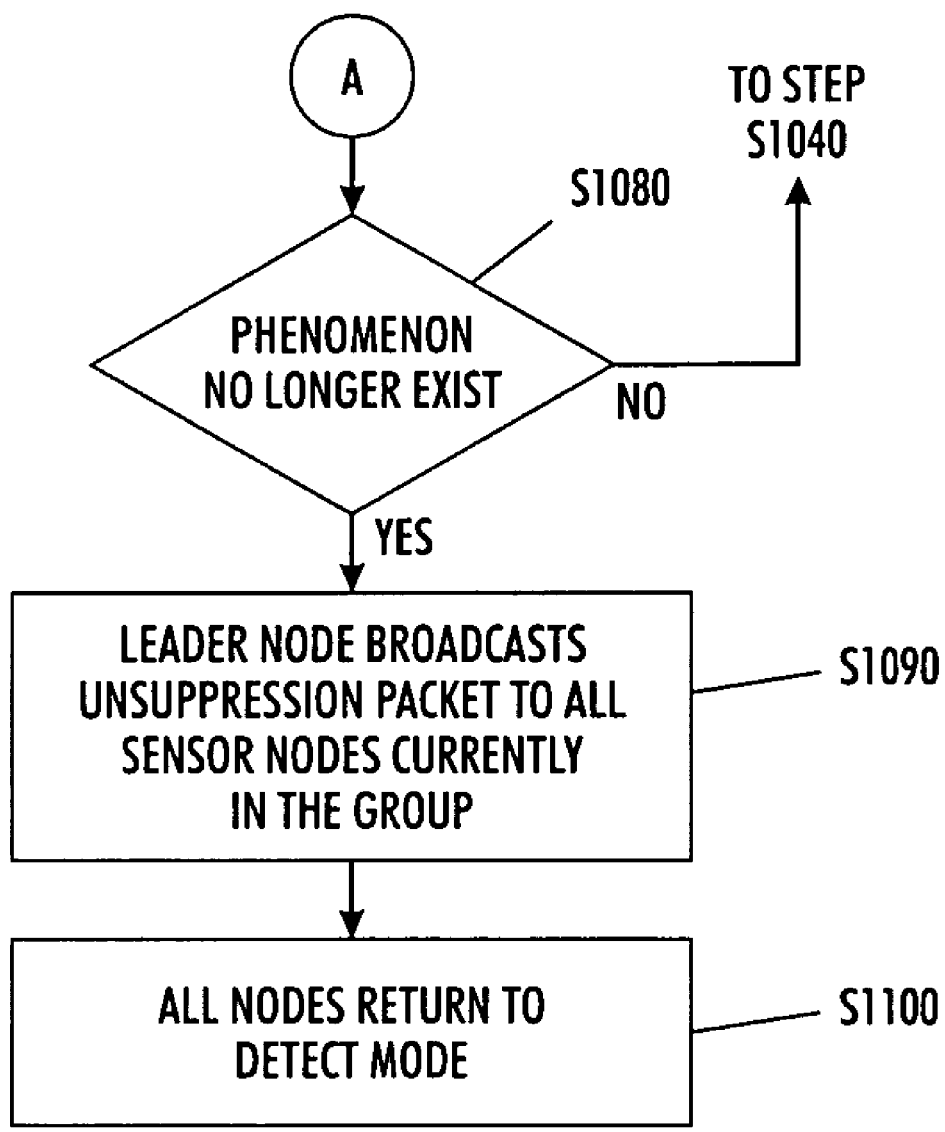

An exemplary embodiment of a method according to this invention is outlined in the flowchart of FIGS. 5 and 6.

Control starts in step S1000 and proceeds to step S1010, where all sensor nodes are in phenomenon detection mode. In step S1020, the sensor node or nodes periodically attempt to detect the presence of a phenomenon. If a phenomenon is detected, control proceeds to step S1030.

With the newly detected phenomenon, control moves to step S1030. A collaborative group is established, and a unique leader is elected through passing of detection packets and comparison between the detection timestamps and likelihood ratios.

Control then moves to step S1040, where the leader node broadcasts a timestamped suppression message to all other nodes in the collaborative group. Nodes receiving the suppression message will be prevented from detecting phenomenon.

Control then moves to step S1050, where the leader node collects data and estimates the state of the detected phenomenon.

Control then moves to step S1060, where the leader redefines the collaborative group based on the estimate of the phenomenon state obtained in step S1050.

Control then moves to step S1070, where the leader node selects among the collaborative group a successor, namely, the new leader node for the next time step.

Control then proceeds to step S1080, where the leader determines whether the phenomenon no longer exists. If yes, control proceeds to step S1090, where the leader node broadcast an unsuppression message to every node in the collaborative group, including the leader itself. Nodes receiving the unsuppression message go back to the phenomenon detection mode.

If no, the phenomenon tracking continues and control returns to step S1040, and the next iteration of tracking continues with a new leader, an updated collaborative group and an updated phenomenon state.

With collaborative group management, each group is associated with the tracking of a single target. The co-existence of multiple tracks in the network can be readily handled as long as the tracks are far apart and the collaborative regions are non-overlapping.

In practice, however, overlap between tracks is possible. For example, in low-probability cases where detection has occurred beyond radius $R_{detect}$ of the target, redundant tracks corresponding to the same target may overlap as the tracking proceeds. Further, in tracking multiple targets, targets crossing over will cause the collaborative regions to overlap. In these cases, sensor nodes in the overlapping collaborative regions need to resolve the ambiguity of which leader to follow, especially when the multiple leaders dictate conflicting actions. There are numerous ways collisions can be handled. An exemplary embodiment of the systems and methods according to the invention for maintaining and managing such overlap conditions is described below.

First, in order for the tracks to be distinguishable, each track is assigned a unique identification, or ID. One simple choice would be the time stamp of the initial detection (for example, in microseconds in various exemplary embodiments of the systems and methods according to the invention) which is sent as part of the initial detection packet. This may optionally be combined with the node ID code of the initial leader. This choice does not require global knowledge shared throughout the network beyond rough time synchronization. The ID is carried along with the track and shared among the sensor nodes in the collaborative group. All messages originating from the group may be tagged with that ID. When a sensor node receives a message, by examining the ID, it knows to which group (and hence to which track) the message refers.

Considering a sensor node which belongs to multiple collaborative groups, each sensor node keeps track of its multiple membership based on the received SUPPRESSION and UNSUPPRESSION messages. A non-leader sensor node ("follower" in the group) can be suppressed by any leader node, but freeing that sensor node normally requires UNSUPPRESSION messages from all the local leader nodes. In other words, a sensor node normally is free only when no network sensor leader node claims ownership over that node.

For a network sensor leader node, a received SUPPRESSION message with a different ID than its own is a clear indication of overlapping tracks. Without the help of a suitable target classification method, the sensor nodes cannot determine whether the overlap is due to multiple targets or represents redundant tracks covering the same target. Furthermore, maintaining overlapping tracks requires source separation and data association, which are inverse problems and generally difficult to implement in distributed networks. In view of such difficulties, this exemplary embodiment employs a relatively simple track merging approach, i.e., one of the tracks survives and other track(s) is dropped. As a result, in this exemplary embodiment, the collaborative groups merge together into a single group.

To decide which track to retain, each leader node compares the ID of the incoming SUPPRESSION message, $t_{suppression}$, with its own, $t_{leader}$. The track corresponding to the incoming SUPPRESSION message may be referred to as the incoming track. Between the incoming track and the current track of the leader node currently, the older track may be retained. This is based on the intuition that an older track has already incorporated many measurements, and thus is in general more accurate and reliable.

The leader node performs a comparison between the IDs. If $t_{suppression} < t_{leader}$, i.e., the incoming track is older, the leader node drops its current track, relays the incoming SUPPRESSION message to its collaborative group, and then gives up leadership. Based on receipt of this message by sensor nodes in the two collaborative groups, the two collaborative network sensor groups merge and proceed to obey the network sensor leader node of the incoming track. If $t_{suppression} \geq t_{leader}$, the current track of the leader node survives. The leader node sends a SUPPRESSION message to the leader node of the incoming track, which behaves symmetrically and merges its group with this leader's group.

This mechanism works well in merging multiple tracks corresponding to a single target. In the case where two (or more) targets approach each other closely, this exemplary embodiment basically tracks the superposition of the two targets as if the two targets could be regarded as a single "virtual" target. Without an accurate source separation scheme in place, the tracking algorithm is unable to tell the two targets apart. When one or more targets separate, the each target separating will be re-detected as a new target.

Figure 7:
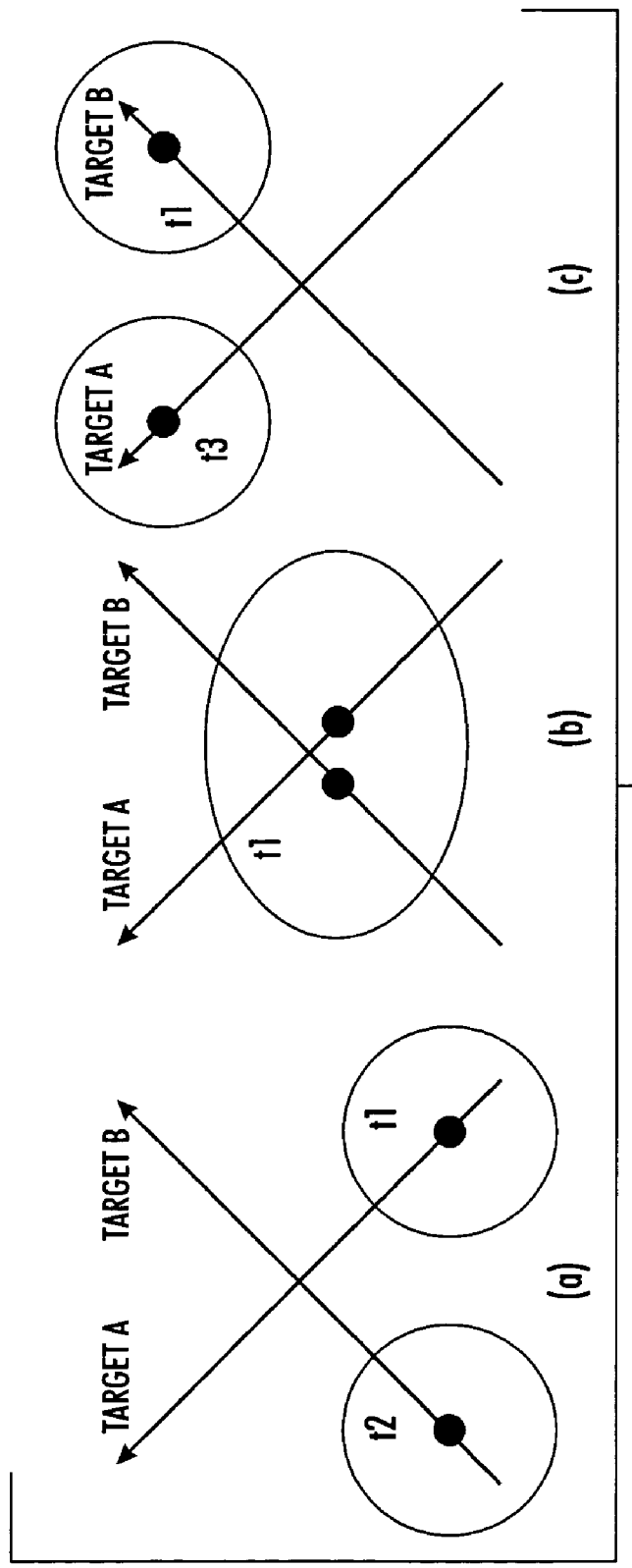
FIG. 7 is a diagram of one exemplary embodiment of target track merging and splitting according to this invention.

FIG. 7 illustrates merging and splitting of tracks. As targets A and B approach each other, their groups merge, and then separate again. This illustration shows that track merging and splitting enables the tracking of multiple targets, but cannot maintain the identities of either of the targets.

Alternatively, a new group ID may be assigned when multiple groups merge into one. A time-contiguous series of location estimates with a consistent identity may be considered to be a "tracklet". For example, FIG. 6 contains four tracklets, two before merging and two after. The target identity of each tracklet may be reacquired using classification schemes and assembling tracklets into complete tracks.

The distributed track initiation and management scheme can be combined with the signal processing and leader selection approach described in J. Lin et al., "Collaborative in-Network Processing for Target Tracking," EURASIP, J. On Applied Signal Processing (2002), IBR, to form a complete, scalable, system. The system works well in tracking multiple targets when the targets are not interfering, and can recover from inter-target interference once the targets move apart.

An actual reduction to practice of an exemplary embodiment of the systems and methods according to the invention disclosed herein is described below as a sensor network for multi-target tracking using a group management scheme. The sensor nodes consists of seventeen WINSNG 2.0 sensor nodes designed and manufactured by Sensoria Corp. Each sensor node is essentially a Hitachi SH-4 based Linux PC with either 1 or 4 acoustic sensor inputs with the location of each sensor established using the Global Positioning System (GPS).

Two type of sensors are used for the acoustic sensor inputs. Acoustic energy sensors are used to output sound energy over a 256-sample window and estimate target distance based on the physics of sound attenuation. Direction-of-arrival (DOA) sensors are arrays of four microphones attached to a single sensor node, and use beam forming techniques, such as, for example, disclosed in Chen et al., "Joint maximum-likelihood source localization and unknown sensor location estimation for near-field wideband signals", Proceedings of the SPIE, vol. 4474, July 2001, IBR, to determine the bearing to the target.

Figure 8:
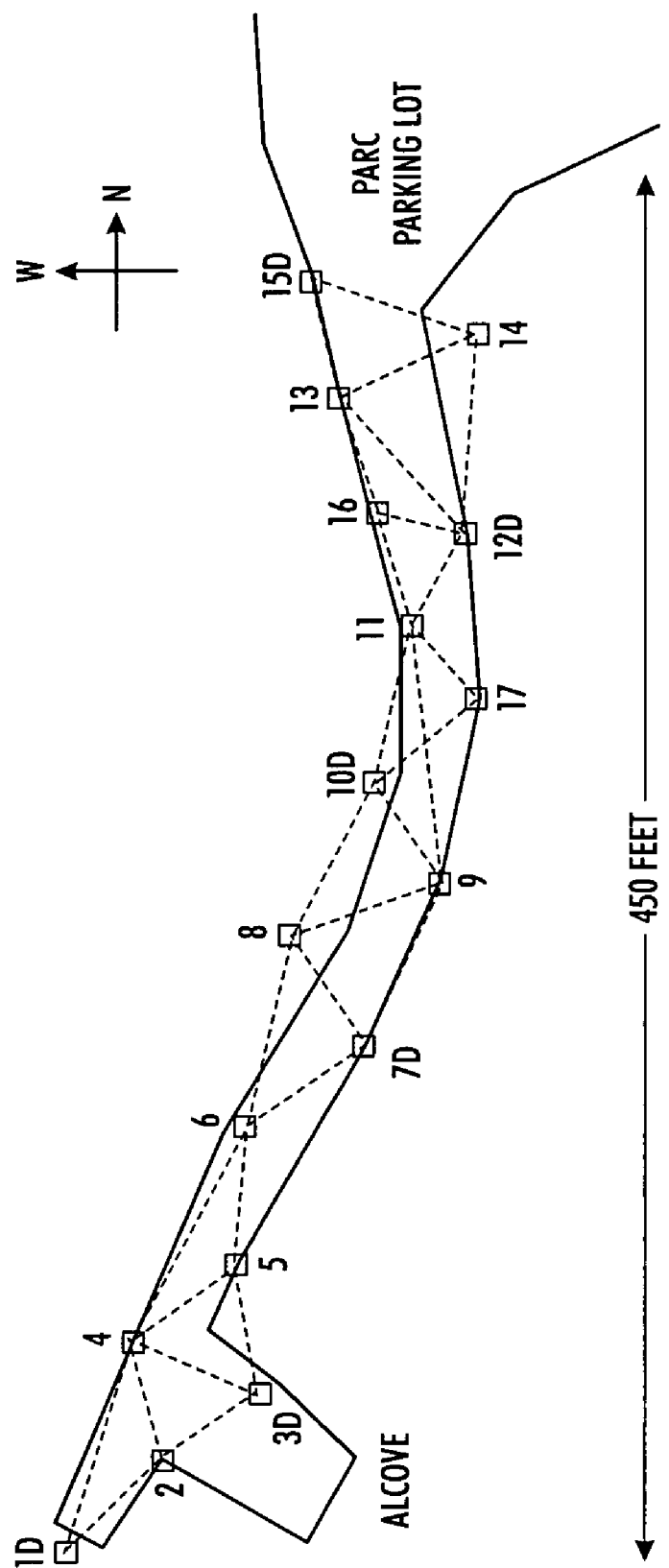
FIG. 8 is a diagram of one exemplary embodiment of a sensor network layout according to this invention.

The sensor nodes include six DOA sensors and eleven acoustic energy sensors. This diversity in sensing modality helps to balance the systematic biases of individual sensors to obtain accurate target location. The sensor nodes are placed along a service road, as plotted in FIG. 8. Neighboring sensor nodes communicate with each other via 802.11b-based wireless links.

The geographically-based group management is built on top of a directed diffusion network protocol. To avoid unnecessary flooding of network packets, the advanced GEAR (Geographic and Energy Aware Routing) protocol is used, which is an implementation of geo-routing in directed diffusion. This protocol is discussed in Brooks et al., "self-Organized Distributed Sensor Network Entity Tracking", International Journal of High Performance Computer Applications, 2002, IBR. The protocol allows data to be sent to a specified geographic region, and limits message propagation outside of the destination region by optimizing the routes to gradually approach the region. Only the destination region is flooded with data. To cope with the constraint in GEAR that the geographic regions have to be specified as rectangles, rectangular bounding boxes may be used. In the exemplary embodiment, the leader-election time-out $t_{comm}$ is set to one second, and the detect range R=is forty-five feet.

Tracking and group management algorithms run on the sensor node in real time. Each sensor node runs a process similar to that described above to decide which sensing mode to use. Two non-interfering targets are tracked. One is a military truck, and the other is a speaker playing a recorded sound of an amphibious assault vehicle (AAV). The ground truth of target locations was measured using differential GPS, which reportedly have an average accuracy of six to ten feet. To measure the tracking performance, the displacement between the location estimates produced by the tracker and the GPS-measured ground truth are computed. The standard deviation averaged over a complete run is about nineteen feet.

Given that GPS measurement error and tracking error are independent, the tracking accuracy is actually better than the reported nineteen feet.

FIG. 9 shows a few snapshots of the tracking result. The belief states are pictured using greyscales. A bright cell indicates that a target is very likely to be on the cell location, and a dark cell suggests otherwise. In FIG. 9a, the first target is detected as it enters the sensor field from the parking lot. The second target has not appeared yet. The rectangular box enclosing the belief state represents the suppression region. The sensor nodes inside the region (sensor nodes 12-16) form a collaborative group, led by sensor node 14. The rest of the network perform stand-alone detection.

Figure 9A:
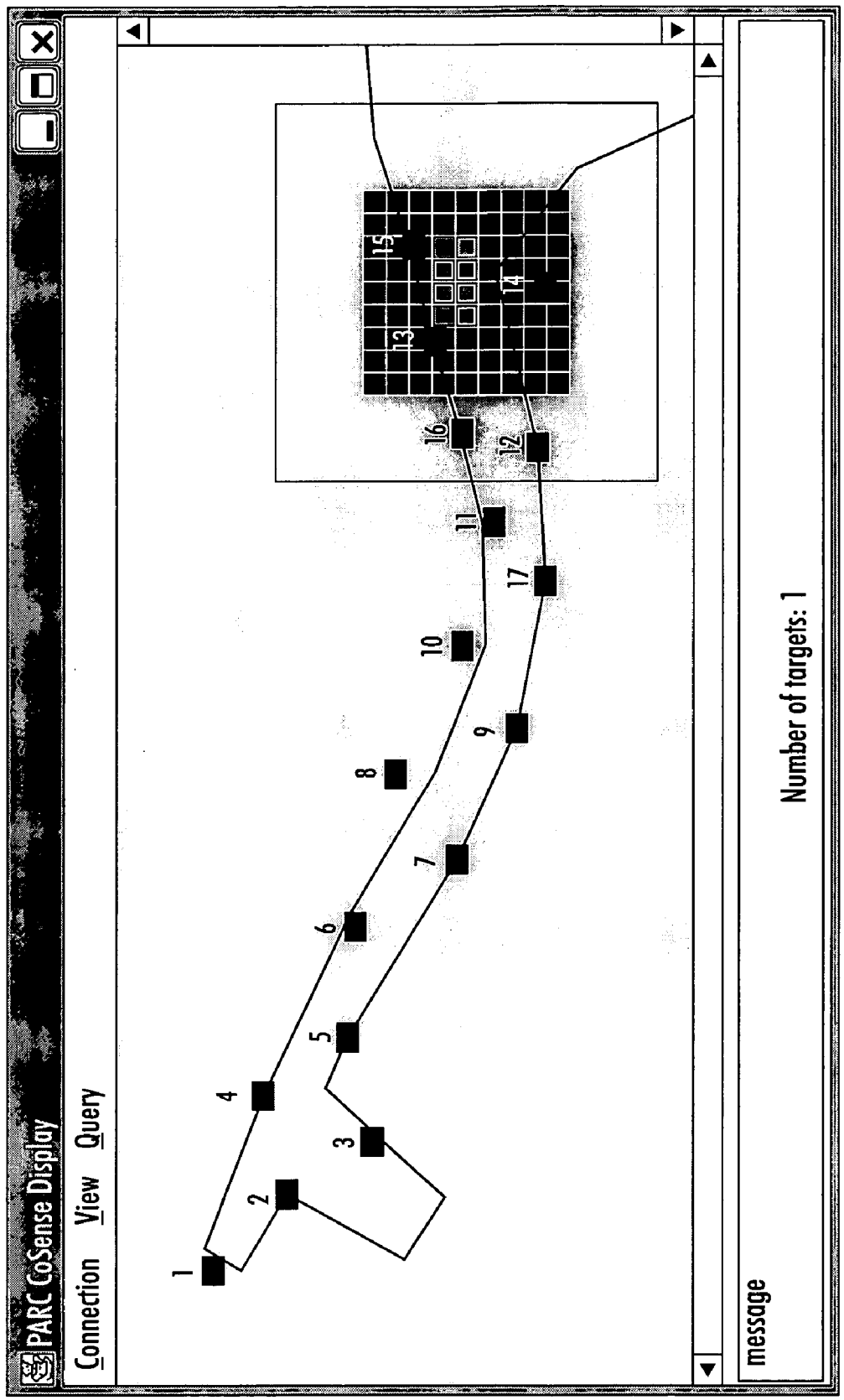
FIG. 9 is a diagram of snapshots of a reduction to practice of one exemplary embodiment of the systems and methods according to this invention.
Figure 9B:
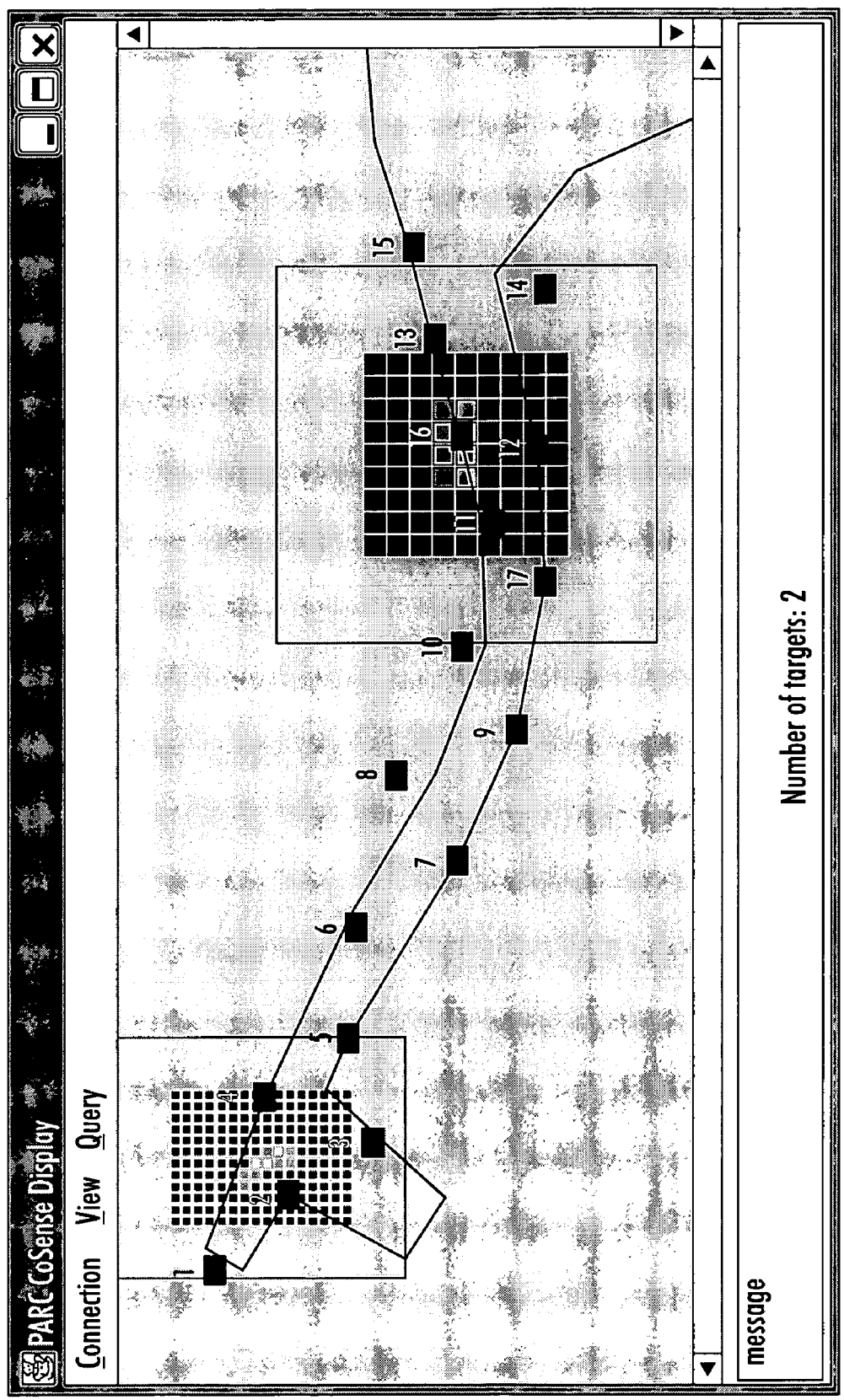

In FIG. 9b, the first target is tracked as it moves along the road (south bound) to the alcove end. Its collaborative region contains sensor nodes 1-5. The second target has just been detected. Sensor nodes 11-14, 16, and 17 form a collaborative group for tracking the second target.

Figure 9C:
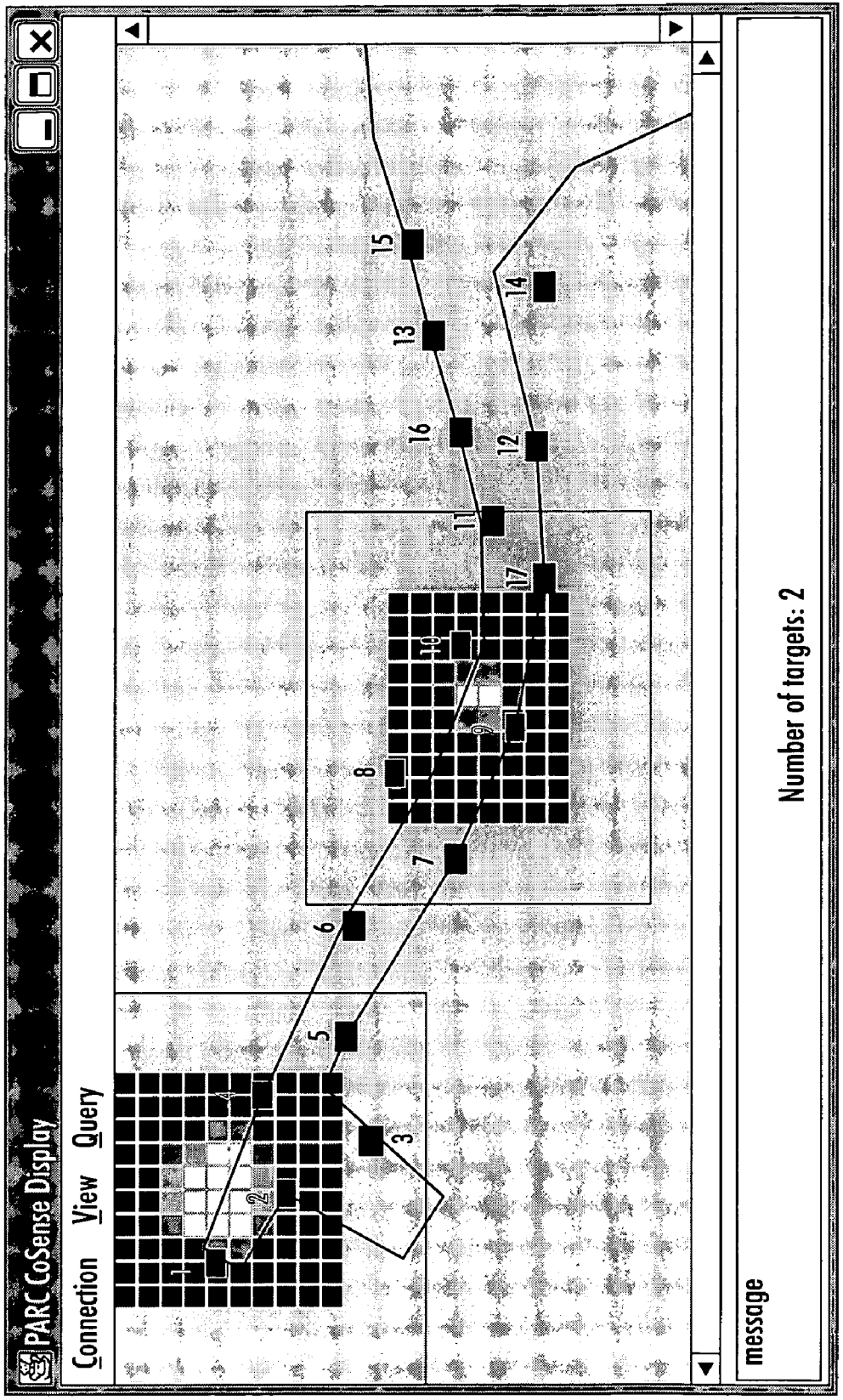
Figure 9D:
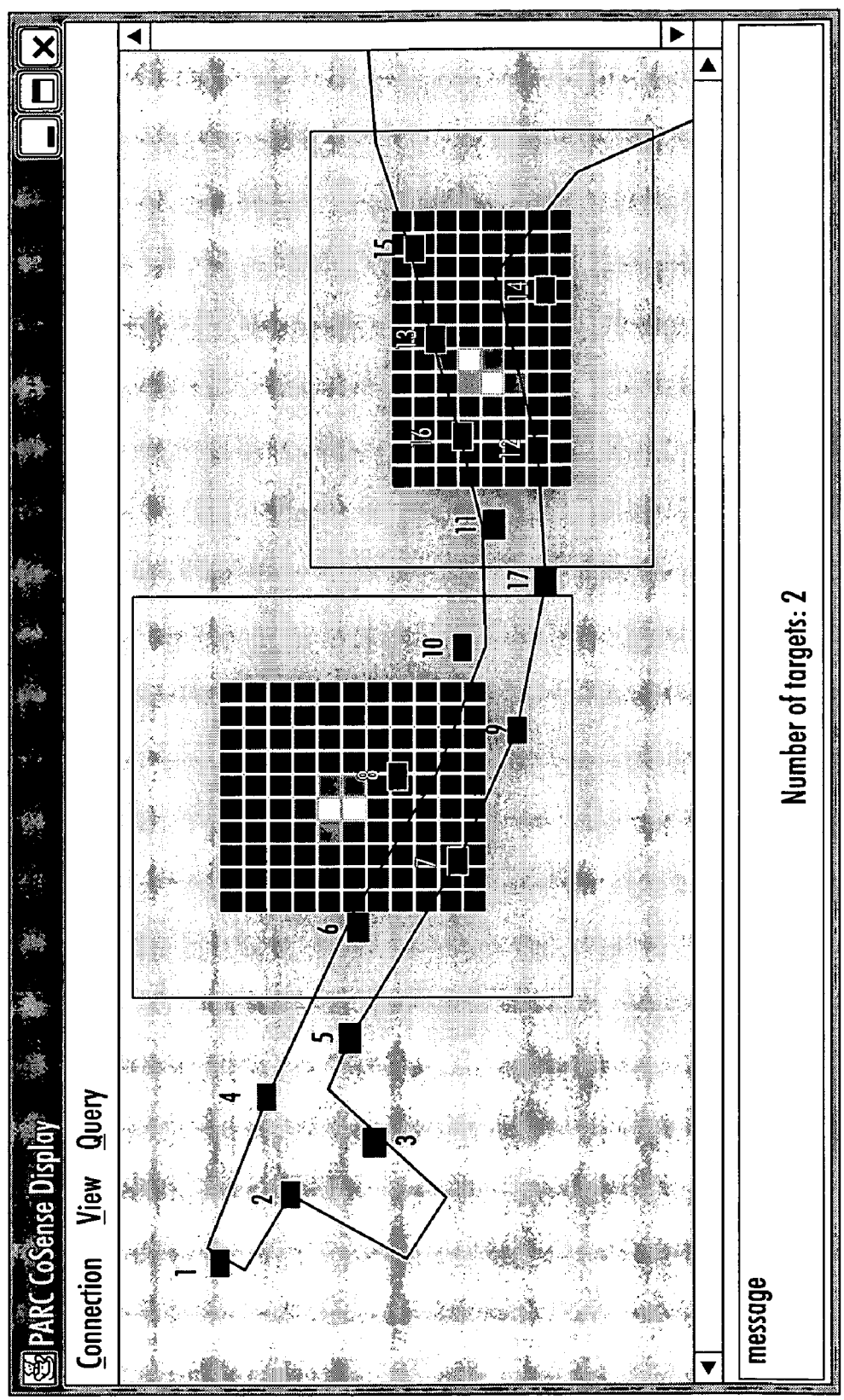

In FIGS. 9c and 9d, two targets are tracked simultaneously. The respective collaborative regions are plotted. The sensors are organized into independently coordinated groups, which enables the co-existence of multiple tracks and the simultaneous tracking of multiple targets.

Tracking of two targets which are occasionally interfering has also been tested. The tracking system has demonstrated an ability to successfully recover from mutual interference via track merging and splitting in several runs where two targets were brought within close proximity of each other and then separated, with two tracks merging into one and then splitting back into two distinct tracks.

While the invention has been described in conjunction with the exemplary embodiments outlined above, it is evident that many alternatives, modifications, and variations would be apparent to those skilled in the art. Accordingly, the exemplary embodiments of the invention, as set forth above, are intended to be illustrative, not limiting. Various changes may be made without departing from the spirit and scope of the invention.

What is claimed is:

1. A method of using sensor networks to detect a phenomenon, comprising:

establishing a first collaborative group of sensor nodes in a sensor network when a phenomenon is detected;

electing a leader sensor node based on broadcast of a message from each sensor node corresponding to a moment the detected phenomenon occurred; and changing the membership of the first collaborative group by adding additional sensor nodes to the first collaborative group as the additional sensor nodes detect changes in the phenomenon over time, while suppressing the creation of a second collaborative group as the additional sensor nodes detect changes in the phenomenon over time, wherein a message from each sensor node with a detection includes a time stamp corresponding to a moment the phenomenon was detected, and a likelihood ratio $p(z_i|H1)/p(z_i|H0)$ indicating a confidence level that the phenomenon was detected, H0 being a hypothesis that a target is not present in a detection range, H1 being a hypothesis that the target is present in the detection range, and $z_i$ being sound energy computed from a sound waveform received by the each sensor node with a detection.

2. The method of claim 1, further comprising sending information packets to each sensor node within an association region of the phenomenon to associate each sensor node with the phenomenon; and suppressing each sensor node in the association region from detecting similar phenomenon.

3. The method of claim 1, further comprising estimating a state of the phenomenon by the leader sensor node.

4. A sensor network system used to detect a phenomenon, comprising:

a plurality of sensor nodes in a sensor network;

at least one processor that establishes membership of a plurality of the sensor nodes in a first collaborative group when a phenomenon is detected by at least one of the sensor nodes;

a leader sensor node election unit that automatically elects a leader sensor node for the first collaborative group based on broadcast of a message from each sensor node corresponding to a moment the detected phenomenon occurred;

a collaborative group membership assignment unit that changes membership of the first collaborative group by adding additional sensor nodes to the first collaborative group as the phenomenon changes over time; and a collaborative group creation suppression unit that suppresses creation of a second collaborative group as the additional sensor nodes detect the same phenomenon, wherein a message from each sensor node with a detection includes a time stamp corresponding to a moment the phenomenon was detected, and a likelihood ratio $p(z_i|H1)/p(z_i|H0)$ indicating a confidence level that the phenomenon was detected, H0 being a hypothesis that a target is not present in a detection range, H1 being a hypothesis that the target is present in the detection range, and $z_i$ being sound energy computed from a sound waveform received by the each sensor node with a detection.

5. The sensor network system of claim 4, further comprising a sender unit that sends information packets to sensor nodes within an association region of the phenomenon to associate the sensor nodes with the phenomenon; and a sensor node suppression unit that suppresses sensor nodes in the association region from detecting similar phenomena.

6. The sensor network system of claim 4, further comprising an estimator unit that estimates a state of the phenomenon by the leader sensor node.

7. The method of claim 3, wherein the state includes a position of the phenomenon.

8. The sensor network system of claim 6, wherein the state includes a position of the phenomenon.

* * * * *